United States Patent [19]

Sammells et al.

[11] Patent Number: 4,545,872
[45] Date of Patent: Oct. 8, 1985

[54] METHOD FOR REDUCING CARBON DIOXIDE TO PROVIDE A PRODUCT

[75] Inventors: Anthony F. Sammells; Peter G. Pa Ang, both of Naperville, Ill.

[73] Assignee: Texaco Inc., White Plains, N.Y.

[21] Appl. No.: 593,221

[22] Filed: Mar. 27, 1984

[51] Int. Cl.[4] .............................................. C25B 3/04
[52] U.S. Cl. ....................... 204/72; 204/75; 204/158 R
[58] Field of Search ................ 204/72, 75, 158 R, 252

[56] References Cited

U.S. PATENT DOCUMENTS

| | | | |
|---|---|---|---|
| 4,219,392 | 8/1980 | Halmann | 204/75 |
| 4,240,882 | 12/1980 | Ang et al. | 204/75 |
| 4,381,978 | 5/1983 | Gratzel et al. | 204/75 |
| 4,427,508 | 1/1984 | Lichtin | 204/158 R |
| 4,427,749 | 1/1984 | Graetzel et al. | 204/75 |

*Primary Examiner*—Andrew H. Metz
*Assistant Examiner*—Terryence Chapman

*Attorney, Agent, or Firm*—Robert A. Kulason; James J. O'Loughlin; Ronald G. Gillespie

[57] ABSTRACT

A process and apparatus for reducing carbon dioxide to at least one useful product includes two redox couple electrolyte solutions separated by a first membrane having photosensitizers. The carbon dioxide to be reduced is provided to a second membrane which is contiguous to one of the redox couple electrolyte solutions. The second membrane has photosensitizers and a catalyst. Water provides hdyrogen ions, which participate in the reduction of the carbon dioxide, via a separator. In operation both membranes are illuminated and produce excited photosensitizers which cause electron transfer from a first redox solution to a second redox solution and thence to the carbon dioxide in the second membrane thereby, in cooperation with the hydrogen ions, reducing at least some of the carbon dioxide at a surface of the second membrane to provide at least one product.

18 Claims, 4 Drawing Figures

4,545,872

METHOD FOR REDUCING CARBON DIOXIDE TO PROVIDE A PRODUCT

BACKGROUND OF THE INVENTION

Field of the Invention

The present invention relates to photoelectrical chemical methods and apparatus for reducing carbon dioxide.

SUMMARY OF THE INVENTION

A process and apparatus for reducing carbon dioxide to at least one useful product includes two redox couple electrolyte solutions separated by a first membrane having photosensitizers. The carbon dioxide to be reduced is provided to a second membrane which is contiguous to one of the redox couple electrolyte solutions. The second membrane has photosensitizers and a catalyst. Water provides hydrogen ions, which participate in the reduction of the carbon dioxide, via a separator. In operation both membranes are illuminated and produce excited photosensitizers which cause electron transfer from a first redox solution to a second redox solution and thence to the carbon dioxide in the second membrane thereby, in cooperation with the hydrogen ions, reducing at least some of the carbon dioxide at a surface of the second membrane to provide at least one product.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
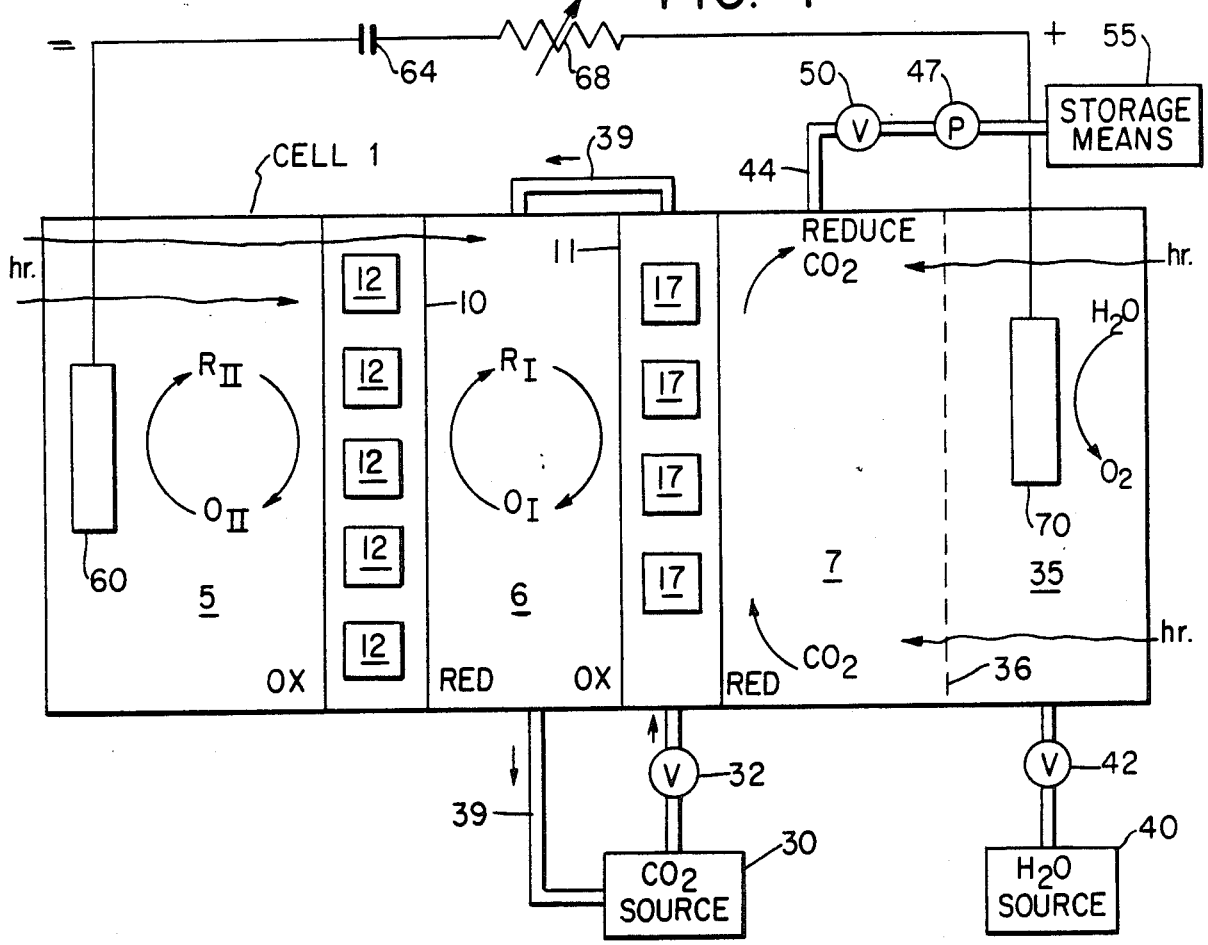
FIG. 1 is a diagrammatic representation of a photo system constructed in accordance with the present invention for reducing carbon dioxide to at least one useful product.

Referring now to FIG. 1, a photochemical reduction cell 1 made of material which permits the passage of light while not passing a fluid, is divided into three chambers 5, 6 and 7 by membranes 10 and 11. Membranes 10 and 11, which may be made of Nafion, contain photosensitizer material represented by blocks 12 and 17, respectively. Membrane 11 will be discussed in detail hereinafter. Membrane 10 with photosensitizers 12 may be also referred to as photosystem II, while membrane 11 with photosensitizers 17 may also be referred to as photosystem I.

Figure 2:
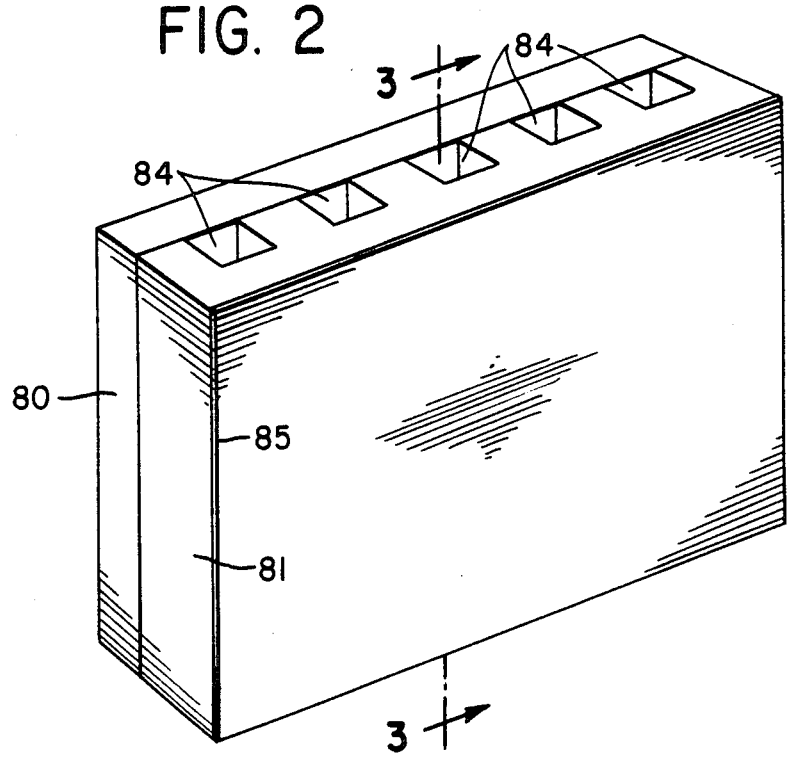
FIG. 2 is a detailed diagram of the membrane receiving carbon dioxide shown in FIG. 1.
Figure 3:
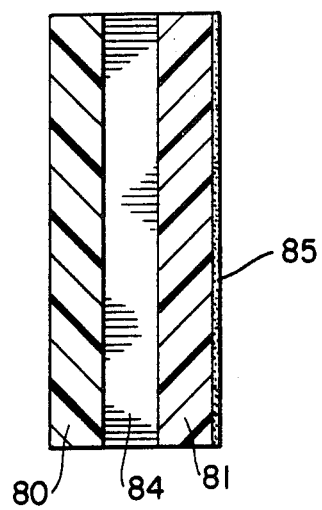
FIG. 3 is a cross-section diagram of the membrane in FIG. 2 along the line A—A.

Referring also to FIGS. 2 and 3, membrane 11 has a n-semiconductor section 80 which provides an oxidation surface to the electrolyte solution in chamber 6. Membrane 11 also has a hydrophobic barrier section 81 having channels 84. A surface 85 of membrane 11 contains a catalyst. Membrane 11 also has, but are not shown, entrance and exit manifolds for the carbon dioxide to enter and leave membrane 11 as hereinafter explained.

Photosystem II may use photosensitizers 12 from the following elements: n-$TiO_2$, n-$Fe_2O_3$, n-$WSe_2$, p-InP, methylene blue or porphyrins while photosystem I may use photosensitizers 17 from the following elements: p-InP, p-WSe2', p-GaAs, p-CdTe, n-$WSe_2$, n-CdSe, Ru(bipy)$_3$Cl$_2$ or phthalocyanines.

Chamber 5 contains an aqueous electrolyte, while chamber 6 contains another aqueous electrolyte. By way of example, the solution in chamber 5 may have a redox system $R_{II}/O_{II}$ from the following redox systems: $H_2O/O_2$, $Br^-/Br_2$, $H_2/H_2O$, methylene blue, $Fe^{+2}/Fe^{+3}$ or EDTA. Chamber 6 may have a redox system $R_I/O_I$ from the following redox systems: $I^-/I_2$, $S^{2-}/S_n^{2-}$, triethanolamine or methyl viologen.

The following table I shows preferred combinations of $R_{II}/O_{II}$, $R_I/O_I$, photosystem II and photosystem I.

TABLE I

| $R_{II}/O_{II}$ | Photosystem II | $R_I/O_I$ | Photosystem I |
|---|---|---|---|
| $H_2O/O_2$ | n-$TiO_2$, n-$Fe_2O_3$ | None | p-InP or p-$WSe_2$, p-GaAs or p-CdTe |
| $Br^-/Br_2$ | n-$WSe_2$ | $I^-/I_2$ | n-$WSe_2$ |
| $H_2/H_2O$ or methylene blue | p-InP | $S^{2-}/S_n^{2-}$ | n-CdSe |
| $Fe^{+2}/Fe^{+3}$ | methylene blue | Triethanolamine | Ru(bipy)$_3$Cl$_2$ |
| EDTA | Porphyrins | Methyl viologen | phthalocyanines |

The nature of the $CO_2$ predominant reduction product is highly dependent upon the catalyst on the surface of membrane 11. For example, if the catalyst is a nickel amalgam, zinc amalgam or lead, the predominant product is formic acid. Other typical products may be formaldehyde, methanol and methane. Materials for this purpose may be selected from Table II.

TABLE II

Chalcogenides (Ni, Co, Mo, W): formed in situ
Titanium dioxide: thin-film coating or particles
SrTiO$_3$: thin-film coating or particles
NADPH (reduced nicotinamide adenine dinucleotide phosphate)
Metal coatings: Pb, In
Amalgams (Ni, Zn)
Chrysene
Ethyl acrylate
Phthalocyanines (Ni, Co)
Porphyrins
Methyl viologen: dissolved species A source 30 provides $CO_2$ through a valve 32 to membrane 11 in reduction cell 1. Another chamber 35 is formed by a separator 36 which also permits the passage of light and hydrogen ions but not electrolyte. Some of the carbon dioxide passes through the hydrophobic barrier section 81 and is reduced by the hydrogen ions and the transferred electrons to a product. Unreacted carbon dioxide from membrane 11 is returned to source 30 by way of a line 39. A source 40 provides water through a valve 42 to chamber 35. The reduced $CO_2$ product is drawn off by way of a line 44 via pump 47 through a valve 50 and provided to storage means 55.

A biasing circuit may be used to improve the electron transfer. Such a circuit includes an electrode 60 which is connected to the negative terminal of a battery 64 whose positive terminal is connected to a potentiometer 68. Potentiometer 68 is connected to another electrode 70.

THEORETICAL DISCUSSION

The left surface of membrane 10 subjected to direct illumination will typically consist of an n-type semiconductor material thereby generating a negative photopotential. This negative photopotential is a result of excitation of electrons from the valence to conduction band of the semiconductor material. Electron holes left in the valence band will drive the oxidation of $R_{II} \rightarrow O_{II}$ on the illuminated side of PS II. $R_{II}/O_{II}$ represents reduced oxidized species in the solution. Ideally, as in the case of natural photosynthesis, this couple should be $H_2O/O_2$. In practice, however, not many n-type semiconductors are stable enough to evolve oxygen. Those that can do it ($TiO_2$, $SrTiO_3$, $Fe_2O_3$) have relatively large band gaps, which means they do not absorb a major portion of sunlight. When a low band gap material such as n-$WSe_2$ is used, a redox couple such as $Br^-/Br_2$ has been found necessary to achieve semiconductor stability. Operation with $H_2O/O_2$ would lead to photocorrosion effects at the semiconductor. With the use of battery 64, potentiometer 68 and auxiliary electrode 60, the oxidized species $O_{II}$ (such as bromine) is reduced back to $R_{II}$ (such as bromide). The auxiliary electrode 70 is biased with a positive voltage so that it oxidizes water species to oxygen.

Figure 4:
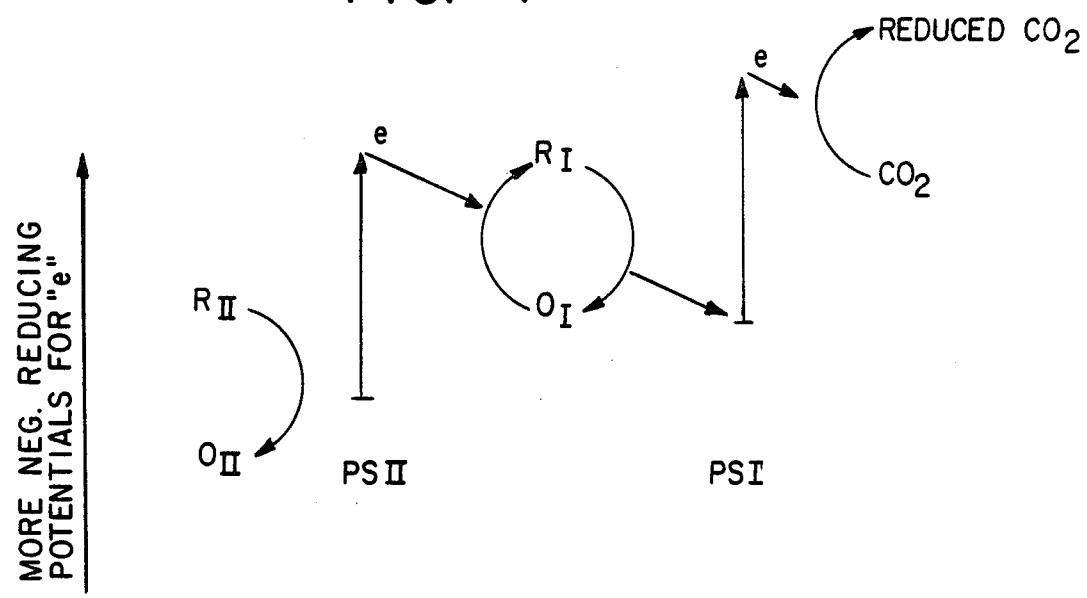
FIG. 4 is a schematic energy diagram of the electron transfer of the system shown in FIG. 1.

While an oxidation reaction occurs on the left side of PS II, a corresponding reduction reaction $O_I \rightarrow R_I$ occurs on the right side. This occurs because electrons in PS II become photoexcited to higher energy levels (i.e., more negative potentials), as shown in FIG. 4. The left side of PS I will also interact with $R_I/O_I$. Thus, $R_I/O_I$ acts like a large transfer relay. The equilibrium electrochemical potential of $R_I/O_I$ is more negative than $R_{II}/O_{II}$; consequently, when excitation of the semiconductor material corresponding to PS I occurs, its photoexcited electrons will be able to reach much higher levels compared to the photoexcitation level of PS II. Electron holes will oxidize $R_I$ to $O_I$ on the left side of PS I. On its right side, the highly energized photoexcited electrons will have the potential to reduce $CO_2$ species. However, competing reactions such as reduction of water species to hydrogen will also occur. It is here that the role of surface catalyst, previously referred to in Table II, will be important. The catalyst for each semiconductor/electrolyte system will be chosen to efficiently produce the most desirable reaction product (e.g. Pb, In, or Hg to produce formic acid).

For both PS I and PS II, n- or p-type semiconductor materials can be used depending upon the direction of illumination. n-type semiconductors will generate a negative photopotential, drive an oxidation reaction on its illuminated surface, and a reduction reaction on its dark side. p-Type material will generate a positive photopotential, drive a reduction reaction on its illuminated surface, and an oxidation reaction on its unilluminated side. The net effect of the overall process will be an electron movement through the photo-reducing membrane from the left side to the right side. To keep electroneutrality in the system, this charge movement has to be balanced by equal migration of positive charges. Nafion membranes are good cation exchangers for species such as $H^+$. The protons will be used on the right side with $CO_2$ to produce, for example, formic acid. Thus water is consumed in the overall process for $CO_2$ reduction.

Separator 36 on the right side of the cell is provided to pass the hydrogen ions while preventing intermixing of the reduced $CO_2$ species with oxygen produced at the positive auxiliary electrode. The oxygen evolved will be vented out from the system. Battery 64, potentiometer 68 and the electrodes 60 and 70 may be used to increase the current necessary for the $CO_2$ reduction process.

The present invention as hereinbefore described is an improved photoelectrochemical method and apparatus for reducing carbon dioxide to a useful product in which the carbon dioxide is provided to a membrane having photosensitizers and catalyst.

What is claimed is:

1. A process for reducing carbon dioxide to at least one useful product comprising the steps of:
   a. providing a $R_{II}/O_{II}$ redox coupled electrolyte solution,
   b. providing a $R_I/O_I$ redox coupled electrolyte solution,
   c. separating the $R_{II}/O_{II}$ solution from the $R_I/O_I$ solution with a first membrane having photosensitizers,
   d. providing carbon dioxide to a second membrane contiguous to the $R_I/O_I$ solution and having photosensitizers and a catalyst,
   e. providing water,
   f. separating the water from the carbon dioxide in a manner so that hydrogen ions, but not oxygen, may pass from the water to participate in the reduction of the carbon dioxide, and
   g. illuminating both membranes to cause electron transfer from the $R_{II}/O_{II}$ solution to the $R_I/O_I$ solution thence to the carbon dioxide to cooperate with passed hydrogen ions in the reducing of the carbon dioxide as the carbon dioxide passes through the second membrane to provide at least one product.

2. A process as described in claim 1 in which the $R_{II}/O_{II}$ redox coupled electrolyte solution is selected from a group of redox couples consisting of $H_2O/O_2$, $Br^-/Br_2$, methylene blue, $Fe^{+2}/Fe^{+3}$ and EDTA.

3. A process as described in claim 2 in which the first membrane's photosensitizer is selected from a group of photosensitizers consisting of n-$TiO_2$, n-$Fe_2O_3$, n-$WSe_2$, p-InP, methylene blue and porphyrins.

4. A process as described in claim 3 in which the $R_I/O_I$ redox coupled electrolyte solution is selected from a group of redox couples consisting of $I^-/I_2$, $S^{2-}/S_n^2$, triethanolamine and methyl viologen.

5. A process as described in claim 4 in which the second membrane's photosensitizer is selected from a group of photosensitizers consisting of p-InP, p-$WSe_2$, p-GaAs, p-CdTe, n-$WSe_2$, n-CdSe, $Ru(bipy)_3 Cl_2$ and phthalocyanines.

6. A process as described in claim 5 in which the catalyst is on the surface of the second membrane that is in contact with the $CO_2$ and is selected from a group of catalysts consisting of dichalcogenides of the metals (Ni, Co, Mo, W), $SrTiO_3$, NADPH, metal coatings (Pb, In), amalgams (Ni, Zn), chrysene, ethyl acrylate, phthalocyanines (Ni, Co), porphyrins and methyl viologen.

7. A process as described in claim 6 in which the illuminating step includes exposing both membranes to solar radiation.

8. A process for reducing carbon dioxide to at least one useful product comprising the steps of:

a. providing a $R_{II}/O_{II}$ redox coupled electrolyte solution,
b. electrically connecting first and second membranes having photosensitizers with the second membrane having a catalyst,
c. providing carbon dioxide to the second membrane,
d. providing water,
e. separating the water from the second membrane in a manner so that hydrogen ions, but not oxygen, may pass from the water to participate in the reduction of the carbon dioxide at the surface of the second membrane,
f. illuminating both membranes so as to produce excited photosensitizers to cause electron transfer from the $R_{II}/O_{II}$ solution to the carbon dioxide thereby reducing the carbon dioxide to provide products.

9. A process as described in claim 8 in which the $R_{II}/O_{II}$ couple is $H_2O/O_2$, the first membrane's photosensitizer is n-$TiO_2$, and the photosensitizer in the second membrane is p-InP.

10. A process as described in claim 8 in which the $R_{II}/O_{II}$ couple is $H_2O/O_2$, the first membrane's photosensitizer is n-$TiO_2$, and the second membrane's photosensitizer is p-$WSe_2$.

11. A process as described in claim 8 in which the $R_{II}/O_{II}$ couple is $H_2O/O_2$, the first membrane's photosensitizer is n-$Fe_2O_3$, and the second membrane's photosensitizer is p-GaAs.

12. A process as described in claim 8 in which the $R_{II}/O_{II}$ couple is $H_2O/O_2$, the first membrane's photosensitizer is n-$Fe_2O_3$, and the second membrane's sensitizer is p-CdTe.

13. A process as described in claim 8 in which a biasing voltage is provided across the $R_{II}/O_{II}$ electrolyte solution and the water.

14. A process as described in claim 13 in which the predominant product produced is formic acid.

15. A process as described in claim 13 in which the predominant product is formaldehyde.

16. A process as described in claim 13 in which the predominant product is methanol.

17. A process as described in claim 13 in which the predominant product is methane.

18. A process as described in claim 8 in which the illuminating step includes exposing the membrane to solar radiation.

* * * * *